UNITED STATES PATENT OFFICE.

ADOLF FELDT, OF FRANKFORT-ON-THE-MAIN, AND PAUL FRITZSCHE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

AUROMERCAPTOBENZENES AND PROCESS OF MAKING SAME.

1,207,284.    Specification of Letters Patent.    Patented Dec. 5, 1916.

No Drawing.    Application filed October 17, 1916. Serial No. 126,218.

*To all whom it may concern:*

Be it known that we, ADOLF FELDT, M. D., and PAUL FRITZSCHE, Ph. D., chemist, citizens of the Empires of Russia and Germany, respectively, residing at Frankfort-on-the-Main and Höchst-on-the-Main, respectively, Germany, have invented certain new and useful Improvements in Auromercaptobenzenes and Processes of Making Same, of which the following is a specification.

We have found that auromercaptobenzenes are obtained by causing gold double-halids to act upon mercaptobenzenes. Those of the said auromercaptobenzenes which dissolve in water are products of great therapeutical value.

In order to illustrate our invention more fully we give the following examples:—

Example I.

*Preparation of auromercaptobenzene.*—5.92 grams of potassium aurobromid, dissolved in 100 cc. of methyl alcohol, are gradually added, while stirring, to 4.4 gr. of thiophenol dissolved in 100 cc. of methyl alcohol. The mixture completely decolorizes and separates a precipitate which is filtered off. This precipitate is washed in 500 cc. of alcohol for 5 hours while stirring, isolated by filtration and dried in a vacuum. When finely triturated the aurothiophenol constitutes an insoluble light-yellow powder of a constant composition corresponding to the formula $C_6H_5SAu$, the percentage of gold contained therein being: calculated = 64.38; found = 63.95.

Example II.

*Preparation of the potassium salt of 2-auromercaptobenzene-1-carboxylic acid.*—A solution of 10.5 grams of potassium aurobromid in 125 cc. of acetic ester are added by drops, while stirring, to 10 gr. of finely-powdered 2-mercaptobenzene-1-carboxylic acid which has been dissolved, while stirring, in 250 cc. of acetic ester and filtered to a clear solution. After a short time, the mixture becomes gradually decolorized and at the same time a brown powdered product separates. After having allowed the mixture to stand for 24 hours the precipitate is filtered off and to the slightly-yellowish-brown filtrate is added one liter of absolute alcohol. A heavy white-yellow precipitate, namely the 2-auromercaptobenzene-1-carboxylic acid immediately separates. After ½ hour's standing the liquid which covers the sediment is decanted and the precipitate is filtered off on a hardened filter and finally washed with alcohol. In a dry state, the product forms a granulated yellowish powder of a constant composition and of the formula:

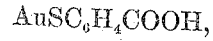

$$AuSC_6H_4COOH,$$

the percentage of gold contained therein being: calculated = 56.23; found = 55.71'. For preparing the potassium salt, 10 gr. of 2-auromercaptobenzene-1-carboxylic acid are dissolved in 40 cc. of aqueous caustic soda lye of 4 per cent. strength and to this solution are then added 250 cc. of alcohol. A white-yellow precipitate separates which is filtered off and dried in a desiccator.

Example III.

For obtaining the sodium salt of the 4-amino-2-auromercaptobenzene-1-carboxylic acid we proceed as follows: We prepare:

(1) *4-nitro-2-thiocyanobenzoic acid.*—183 gr. of 4-nitro-2-amino-1-benzoic acid are dissolved in 2 liters of caustic soda lye of 2 per cent. strength while heating. The hot solution is then poured, while stirring, into one liter of water cooled with ice and to the mixture are added 71 gr. of sodium nitrate dissolved in 500 cc. of water and 450 cc. of concentrated hydrochloric acid. After one hour, the slight residue is filtered off. To this filtrate are added, while stirring, at 15° C. 400 gr. of potassium sulfocyanate dissolved in 2 liters of water and 10 gr. of copper-bronze. The temperature is kept at 15° C. by adding ice. After two hours, the precipitate is filtered off and then dissolved in 2 liters of caustic soda lye of 2 per cent. strength; the copper bronze is removed by filtration and the filtered product is precipitated by means of hydrochloric acid. When dry, the nitro-thiocyanobenzoic acid thus obtained constitutes a yellowish, crystalline powder melting at 161° C. The percentage of sulfur and nitrogen contained therein being: calculated=14.21 and 12.5 respectively; found=14.29 and 12.77 respectively.

(2) *4-amino-2-mercaptobenzene-1-carboxylic acid.*—115 gr. of 4-nitro-2-thiocyanobenzoic acid are dissolved at 40° C. in 500 cc. of caustic soda lye of 2 per cent. strength and into the solution are run, while stirring, 720 gr. of $Na_2S + 9H_2O$ dissolved in 720 cc. of water. After one hour, the solution is poured into 590 cc. of pure concentrated hydrochloric acid diluted with an equal volume of water. The yellowish residue is collected on the filter and dissolved in 500 cc. of caustic soda lye of 2 per cent. strength. The solution is filtered so as to become clear and poured while stirring into strongly-diluted hydrochloric acid prepared from 200 cc. of concentrated hydrochloric acid in two liters of water. The whole is allowed to stand over night whereupon the yellow precipitate is filtered off. The filtrate is neutralized with caustic soda lye when the aminomercaptocarboxylic acid precipitates. By redissolving the same it is purified. When dry, the 4-amino-2-mercaptobenzene-carboxylic acid constitutes a yellowish-white powder, melting at 216° C. and soluble in alcohol, acetone and strongly-diluted hydrochloric acid.

(3) *4-amino-2-auromercaptobenzene carboxylic acid.*—16.8 gr. of aminomercaptobenzene-carboxylic acid dissolved in 200 cc. of chemically pure caustic soda lye of 4 per cent. strength and filtered until clear, are run into 2 liters of diluted hydrochloric acid while stirring and, if required, the mixture is decolorized by means of animal charcoal. To the filtrate is added in the course of ½ hour, while stirring, a solution of 14.8 gr. of potassium auro-bromid in one liter of water. The 4-amino-2-auromercaptobenzene carboxylic acid separates as a yellow precipitate which is at once filtered on a hardened filter, washed with water until neutral, then with alcohol and finally again washed with ether. The filter with the precipitate is then dried over sulfuric acid and the acid which agglomerates to a hard lump and which, after being completely dry, can be easily separated from the filter, is triturated to a powder of a light-yellow color which is insoluble in the usual solvents.

(4) *The sodium salt of 4-amino-2-auromercaptobenzene-1-carboxylic acid.*—10 gr. of aminoauromercaptobenzene carboxylic acid are dissolved in 50 cc. of chemically pure caustic soda lye of 4 per cent. strength and filtered until a clear solution is obtained to which is then added one liter of spirit. The sodium salt mostly separates at once in the form of a powder, sometimes it first remains dissolved in a colloidal state and separates as flakes only after being carefully and gently heated while stirring. The liquid which covers the sediment is carefully decanted, the sodium salt collected on a hardened filter, again well washed with alcohol—in order to completely dissolve any excess of caustic soda—and finally washed with ether. The filter with the precipitate is dried over concentrated sulfuric acid; the salt which agglomerates to a lump and which can be easily separated from the filter when completely dry, is triturated to a yellow powder and dried in a vacuum at 120° C. until its weight becomes constant. The sodium salt thus obtained is readily soluble in water, insoluble in organic solvents.

Having now described our invention what we claim is:

1. The process of preparing auromercaptobenzenes, which consists in causing gold double-halids to act upon mercaptobenzenes.

2. As new products, auromercaptobenzenes corresponding to the general formula:

$$X-S.Au$$

wherein "X" stands for any benzene nucleus, being solid bodies of a yellowish color.

3. As a new product, the sodium salt of the 4-amino-2-auromercaptobenzene-1-carboxylic acid having the formula:

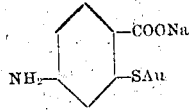

being a yellowish powder, readily soluble in water, insoluble in organic solvents.

In testimony whereof, we affix our signatures in presence of two witnesses.

Dr. Med. ADOLF FELDT.
Dr. Phil. PAUL FRITZSCHE.

Witnesses:
Jean Grund,
Carl Grund.